April 1, 1941.  T. A. HALLER ET AL  2,236,902

RESILIENT SEAL

Filed Dec. 7, 1938

Inventors
J. A. Miner
T. A. Haller
by
Attorney

Patented Apr. 1, 1941

2,236,902

UNITED STATES PATENT OFFICE 2,236,902

RESILIENT SEAL

Theodore A. Haller and John A. Mimer, Springfield, Ill., assignors to Allis-Chalmers Manufacturing Company, Milwaukee, Wis., a corporation of Delaware Application December 7, 1938, Serial No. 244,378

5 Claims. (Cl. 286—11)

This invention relates to improvements in seals for relatively rotating parts operating under conditions tending to cause or to permit the entrance of foreign matter between the parts, and more particularly to means for sealing the joints between a rotating part projecting from a stationary part, against the possibility of entry of abrasive material into the joint or into the stationary part.

Various kinds of machines, such as tractors, operate in the presence of air or water borne abrasive material. All such machines include parts within casings which usually contain lubricant and from which other parts project into the presence of abrasive material. It is accordingly necessary that the joint between a relatively stationary casing and a rotating part projecting therefrom be sealed against the escape of lubricant and against the entry of abrasive material into the casing. Machines such as tractors are often operated continuously for long periods of time by relatively unskilled persons and under all possible atmospheric conditions. The joints exposed to atmosphere must therefore be sealed by means which do not require external lubrication, which remain effective under all conditions without adjustment thereof, and in which the seal will clear itself of obstacles to its proper functioning. Machines which must be produced by mass production methods in order to be available at the lowest possible price also require a seal of as few parts as possible and which is readily assembled to the joints of the machine to be sealed.

It is therefore an object of the present invention to provide a seal with the minimum number of parts and in which the parts are readily assembled to effect proper sealing of the rotating joints of a machine operating in the presence of abrasive material.

Another object of the invention is to provide a seal which will automatically retain its sealing surfaces in the proper relation regardless of relative axial, radial or rotational movement of the joining parts being sealed and regardless of the pressure interiorly or exteriorly of the seal.

Another object of the invention is to provide a seal which will automatically clear itself of obstacles to the proper operation thereof regardless of the atmospheric conditions under which the machine must operate.

Objects and advantages other than those set forth above will be apparent from the following description when read in connection with the accompanying drawing, in which.

Figure 1:
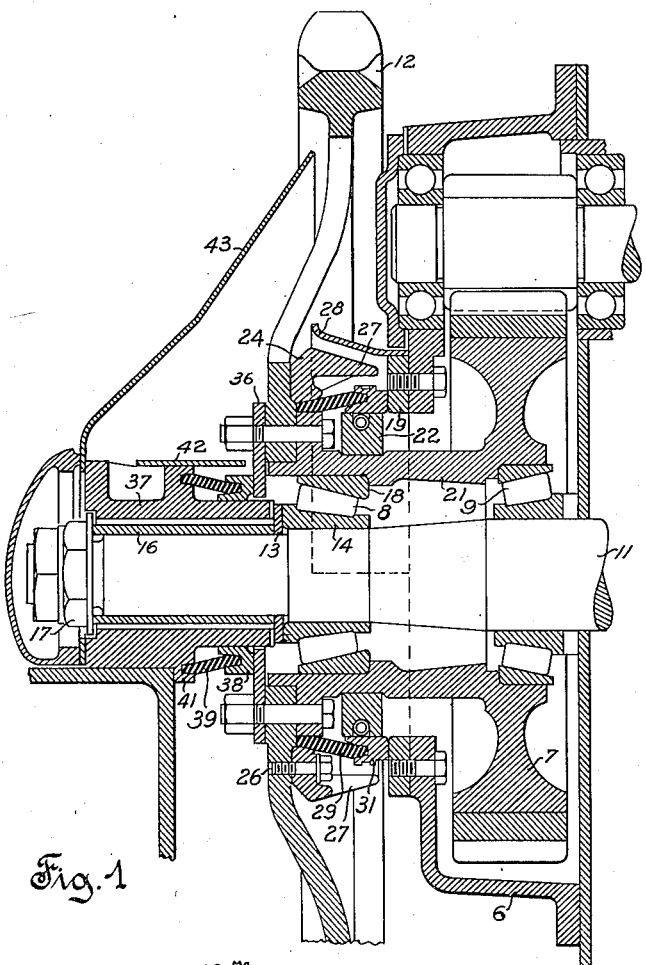
Fig. 1 is a vertical sectional view taken substantially on a central plane, of a portion of the final drive of a tractor of the track laying type.
Figure 2:
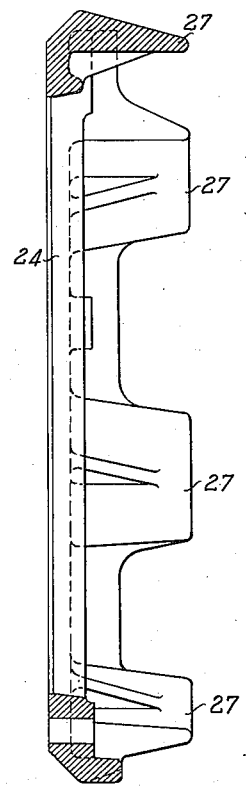
Fig. 2 is an enlarged sectional view of a portion of the seal structure illustrated in Fig. 1 and acting to clear obstacles from the seal.

Referring more particularly to the drawing by characters of reference, the reference numeral 6 designates a casing in which is mounted a gear 7 rotating in roller bearings 8 and 9. The hub of the gear 7 extends through the casing 6 and has mounted thereon a sprocket wheel 12 which engages the track of a track laying tractor of the type known and therefore not further described. The shaft 11 is provided with a flange or plate 13 forced against the inner raceway 14 of the bearing 8 by a sleeve 16 extending over the shaft 11 and under the action of a nut 17 on the shaft to retain the bearing in its proper position. The outer raceway 18 of the bearing 8 is fixedly seated in the hub of the gear 7. The casing 6 has mounted thereon an annular plate 19 extending about the casing opening through which the shaft 11 and the hollow hub 21 of the gear 7 project from the casing. The plate 19 is preferably of rust resisting material provided with a plane surface which is preferably either hardened or covered with an adherent coating or plating of a smooth and hard material. A split ring 22 is mounted on hub 21 in a suitable groove therein and is retained in the groove by a resilient member such as a helical spring 23 extending around the ring 22 in a groove in the outer periphery thereof. The plate 19 and ring 22 are spaced from each other and thus provide an aperture through which abrasive material may enter the gear casing 6, thereby contaminating the lubricant therein and causing excessive wear of the gears in the casing and the bearings for such gears.

It is therefore necessary to provide a seal to prevent the entrance of undesired foreign material into the casing 6 and which seal, according to the present invention, requires only three elements or parts. A retainer 24 for the active seal element is formed as a substantially annular plate and is mounted on the sprocket 12 by suitable bolts or studs 26 extending through the retainer and sprocket. The retainer is provided with lugs 27 extending from the retainer plate portion inwardly toward the casing 6. The lugs 27 extend under a semi-cylindrical flange 28 mounted on the casing 6 and extending outwardly therefrom over the lugs 27 and into proximity with the annular portion of the retainer.

The retainer 24 and a flange on the hub 21 provide means for retaining one end of a substantially tubular piece 29 of resilient material which is unaffected by atmospheric conditions, oil or grease and which will not readily take a permanent set under compression. Such material is preferably one of the artificial rubberlike compounds now known to the art. The other end of the tubular piece 29 is secured in a groove in a ring 31 provided with a sealing surface engaging with a plane, hardened surface of plate 19. Ring 22 acts only to guide ring 31 and hold it substantially concentric with plate 19. Lubricant can pass between ring 22 and ring 31, but cannot escape through or around tubular piece 29 which is secured at both ends. The ring 31 is preferably made of deformable material which is slightly resilient or at least is sufficiently pliable to allow adaptation of the ring to the surfaces of the other parts with which the ring is in contact.

The space between shaft 11 and gear hub 21, which is occupied by bearing 8, must also be sealed against the entrance of abrasive material into the bearing and through the bearing into the casing 6. A plate 36 is accordingly mounted on the sprocket wheel 12 and extends into close proximity with a casing 37 over the end of the shaft 11. The space between the plate 36 and the casing 37 is sealed by a sealing ring 38, similar to ring 31 and likewise bearing on the plate 36. Casing 37 guides ring 38 holding it substantially concentric with plate 36. Lubricant can pass between ring 38 and the adjacent portion of casing 37 but cannot escape through or around sealing tube 39 which is secured at both ends. The seal ring is held in contact with plate 36 by a sealing tube 39 connecting the sealing ring with a flange 41 on the shaft casing 37. Large pieces of foreign material are prevented from coming into contact with the sealing ring 38 and the sealing tube 39 by a substantially semi-cylindrical shield 42 mounted on the shaft casing 37 directly over the sealing tube and ring and extending into proximity with the plate 36 and by a substantially semi-conical shield 43 mounted on the shaft casing 37 and extending into proximity with the ring of the sprocket 12.

Tube 29 is preferably of such length as to be under at least slight compression when ring 31 abuts the plate 19 thus retaining the relatively movable surfaces in engagement. Lubricant in the casing 6 lubricates the engaging surfaces of the seal and particularly the rubbing surfaces of the ring 31. Flange 28 on the casing 6 cooperates with the lugs 27 of the retainer 24 to provide a labyrinth through which it is difficult for larger masses of abrasive material to pass. If water or a finely ground wet material should pass into and freeze in the space under flange 28 and lugs 27, the lugs which rotate with the sprocket wheel 12, will break up such frozen masses in conjunction with the flange 28 and will move the broken pieces beyond the flange or guard where they will drop to the ground.

Figure 3:
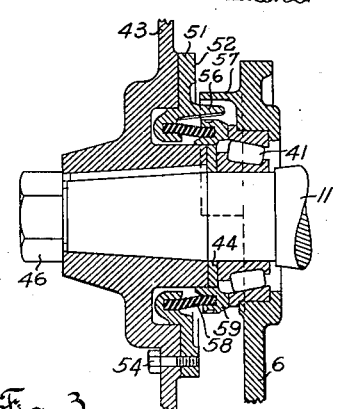
Fig. 3 is a view similar to that of Fig. 1 but showing a modified form of the seal to be employed.

Fig. 3 illustrates a modified form of the present seal, in which shaft 11 mounted on roller bearings as shown at 41 extends within the casing 6. A sprocket wheel indicated at 43, is rigidly mounted on the shaft 11, thus making it necessary to provide a seal only between the sprocket wheel 43 and the casing 6. The shaft 11 is provided with a plate 44 forced against the inner raceway of the bearing 41 by the hub of the sprocket wheel 43 under the action of a nut 46 on the shaft to retain the bearing in its proper position. The outer raceway of the bearing 41 is fixedly seated in the casing 6. A tight closure is thus provided between the flange or plate 44, the inner raceway of the bearing 41, and the hub of the sprocket wheel 43. The rollers of the bearing 41, however, still provide a space into and through which abrasive material may enter the gear casing 6.

It is therefore necessary to provide a seal which will prevent the entrance of undesired foreign material into the bearing 41 and therethrough into the gear casing 6. A groove 47 is formed in the sprocket wheel 43 adjacent the hub thereof to receive a retainer 51 for the active seal element. The retainer is formed as a substantially annular plate 52 having a cylindrical and U-shaped portion 53 extending into the sprocket wheel groove 47. The retainer is held in position to form a tight and preferably gasketed joint with the sprocket wheel 43 by suitable bolts or studs 54 passing through the retainer and the sprocket wheel. The retainer is provided, over at least the upper portion thereof, with lugs 56 extending from the plate portion 52 of the retainer inwardly toward the gear casing 6. The lugs 56 extend under a semi-cylindrical flange 57 formed on the casing 6 and extending outwardly therefrom over the lugs 56 and into proximity with a groove in the retainer plate 52.

The U-shaped portion 53 of the retainer provides a means for retaining one end of sealing tube 58 of resilient material and is formed preferably of one of the artificial rubberlike compounds now known. The other end of the sealing tube 58 is secured in a groove in a ring 59 provided with a sealing surface engaging the end of the outer raceway of the bearing 41. Ring 59 is guided so as to be substantially concentric with the outer raceway of the bearing 41 by the outer periphery of plate 44 and the adjacent portion of the hub of the sprocket wheel 43. The ring 59 is again preferably made of slightly resilient or pliable non-metallic material to allow adaptation of the ring to the surface of the portion moving in relation thereto.

Retainer 51, sealing tube 58, and sealing ring 59, are all joined to form fixed joints which may therefore be made dust tight in any suitable manner and thus form a fixed seal with the sprocket wheel 43. The sealing tube 58 is preferably under at least a slight degree of compression when the sealing ring 59 engages with its sealing surfaces, thus retaining the relatively movable sealing surfaces in engagement. Lubricant may pass from the casing 6 through the bearing 41 to lubricate the engaging surfaces of the seal. The flange 57 on the casing 6 cooperates with the groove in the retainer and the lugs 56 extending from the retainer to provide a labyrinth through which it is difficult for larger masses of abrasive material to pass. If water or finely ground wet material should find its way into the space between the flange 57 and about the lugs 56, the lugs 56 will break up such masses and will move the broken pieces beyond the flange 57 from which such pieces will be discharged.

Although only a few embodiments of the present invention have been illustrated and described, it is to be understood that modifications and changes therein may be made by those skilled in the art without departing from the spirit of the invention or from the scope of the following claims.

It is claimed and desired to secure by Letters Patent:

1. In a seal for the joint between relatively moving parts, a straight relatively stiff tube mounted at one end on one of the parts and extending toward the other part, a ring attached to the free end of said tube and held thereby in contact with the other part, the one part and said ring being grooved for direct reception of the ends of said tube, a divided ring mounted on the one part, and a spring mounted on and retaining the portions of said divided ring in position, said attached ring being concentrically mounted on and axially guided by said divided ring.

2. In a seal for the joint between relatively moving parts, a resilient tube mounted at one end on one of the parts and extending toward the other part, a ring attached to the free end of said tube, and held thereby in contact with the other part, a ring mounted on the one part in concentric engagement with and concentrically supporting and axially guiding said tube attached ring, and a lug extending from the one part toward the other part and adjacent said tube whereby material collecting about said tube is removed.

3. In a seal for the joint between relatively moving parts, a resilient tube mounted at one end on one of the parts and extending toward the other part, a ring attached to the free end of said tube and held thereby in contact with the other part, a guard mounted on the other part and extending toward the one part exteriorly of said tube, and a lug extending from the one part toward the other part and within and adjacent said guard whereby material collecting about said tube is removed.

4. In a seal for the joint between relatively moving parts, a resilient tube mounted at one end on one of the parts and extending toward the other part, a ring attached to the free end of said tube, a plate mounted on the other part and having a surface on which said ring is pressed by said tube, and a lug extending from the one part toward and within the other part whereby material collecting about said tube is removed.

5. In a seal for the joint between relatively moving parts, a resilient tube mounted at one end on one of the parts and extending toward the other part, a ring attached to the free end of said tube, a ring mounted on the one part to guide said tube attached ring, a plate mounted on the other part and having a surface on which said tube attached ring is pressed by said tube, a guard mounted on the other part and extending toward the one part exteriorly of said tube, and a lug extending from the one part toward the other part and adjacent said guard whereby material collecting about said tube is removed.

JOHN A. MINER.
THEODORE A. HALLER.